(12) United States Patent
Nonobe

(10) Patent No.: US 8,765,317 B2
(45) Date of Patent: Jul. 1, 2014

(54) FUEL CELL SYSTEM

(75) Inventor: Yasuhiro Nonobe, Aichi (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 982 days.

(21) Appl. No.: 12/446,315

(22) PCT Filed: Nov. 14, 2007

(86) PCT No.: PCT/JP2007/072487
§ 371 (c)(1),
(2), (4) Date: Sep. 24, 2010

(87) PCT Pub. No.: WO2008/062807
PCT Pub. Date: May 29, 2008

(65) Prior Publication Data
US 2011/0027679 A1 Feb. 3, 2011

(30) Foreign Application Priority Data
Nov. 22, 2006 (JP) .................. 2006-315880

(51) Int. Cl.
*H01M 8/04* (2006.01)
*H01M 8/10* (2006.01)

(52) U.S. Cl.
USPC ......................................... 429/432; 429/452

(58) Field of Classification Search
USPC .................................. 429/432, 452
See application file for complete search history.

(56) References Cited

U.S. PATENT DOCUMENTS

| | | | |
|---|---|---|---|
| 6,602,625 B1 * | 8/2003 | Chen et al. ..................... | 429/414 |
| 2003/0180590 A1 * | 9/2003 | Hase et al. ...................... | 429/26 |
| 2006/0110642 A1 * | 5/2006 | Sugiura et al. .................. | 429/26 |
| 2006/0222924 A1 * | 10/2006 | Matsuoka ........................ | 429/34 |
| 2007/0224482 A1 * | 9/2007 | Shimoi et al. ................... | 429/33 |

FOREIGN PATENT DOCUMENTS

| | | | |
|---|---|---|---|
| DE | 103 32 520 A1 | | 2/2005 |
| EP | 716463 A2 | * | 6/1996 |
| JP | 5-502973 A | | 5/1993 |
| JP | 2002-184438 A | | 6/2002 |
| JP | 2004-165058 A | | 6/2004 |
| JP | 2005-285692 A | | 10/2005 |
| JP | 2007-194177 A | | 8/2007 |
| JP | 2007-335220 A | | 12/2007 |
| JP | 2008-10196 A | | 1/2008 |
| WO | WO 02082573 A1 | * | 10/2002 |
| WO | WO 2004102708 A2 | * | 11/2004 |

OTHER PUBLICATIONS

Concise Explanation of Relevance of JP 2002-184438 A1 (document filed with IDS filed Sep. 24, 2010).

* cited by examiner

*Primary Examiner* — Gregg Cantelmo
(74) *Attorney, Agent, or Firm* — Kenyon & Kenyon LLP

(57) ABSTRACT

A fuel cell system has a fuel cell stack and a controller. The fuel cell stack is formed by stacking cells. The controller executes first cell voltage recovery processing when the cell voltage of a first cell group, placed at each end of the fuel cell stack, is below a first lower limit voltage threshold and executes second cell voltage recovery processing, which is different from the first cell voltage recovery processing, when the cell voltage of a second cell group, placed at substantially the center of the fuel cell stack, is below a second lower limit voltage threshold.

5 Claims, 4 Drawing Sheets

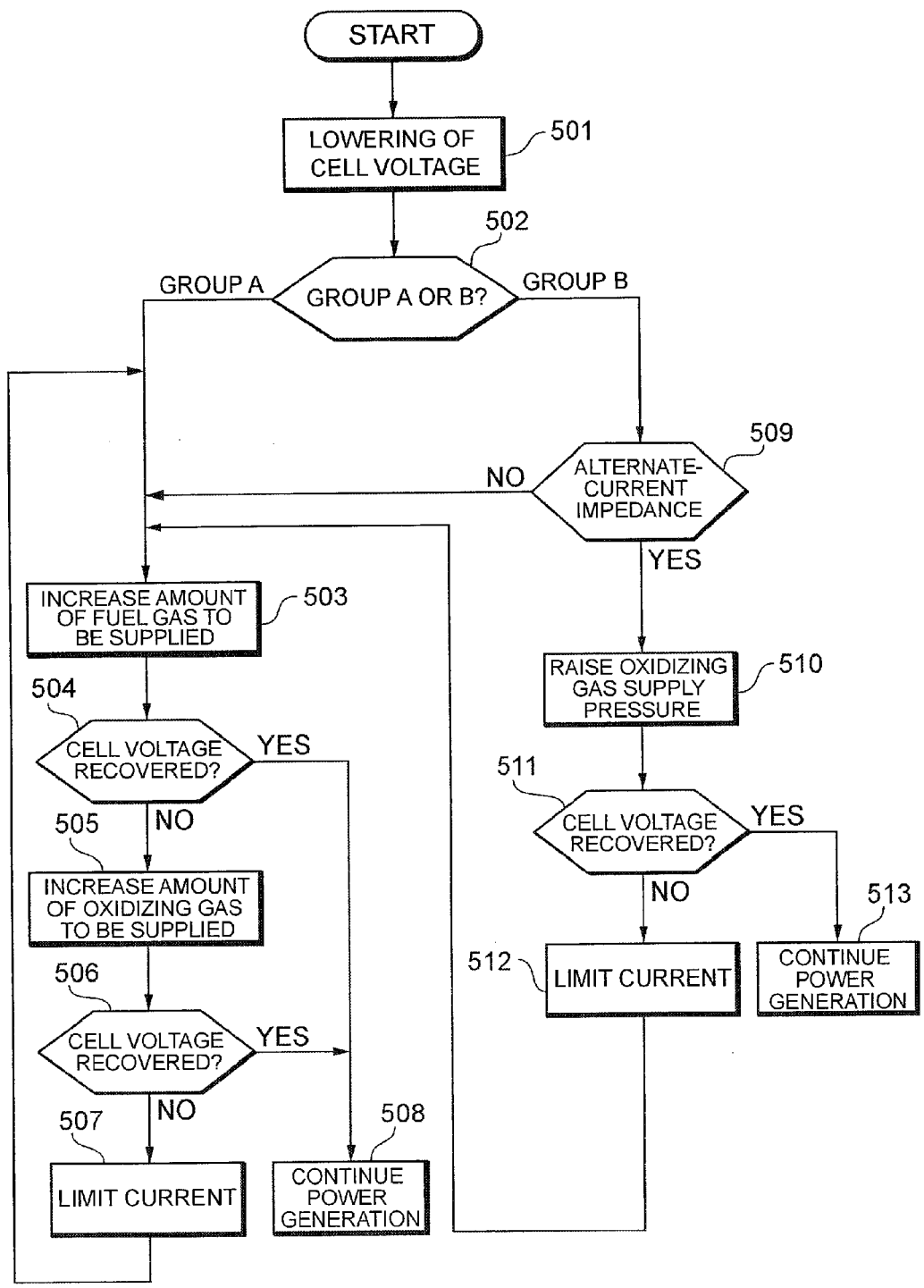

FUEL CELL SYSTEM

This is a 371 national phase application of PCT/JP2007/072487 filed 14 Nov. 2007, which claims priority to Japanese Patent Application No. 2006-315880 filed 22 Nov. 2006, the contents of which are incorporated herein by reference.

TECHNICAL FIELD

The present invention relates to a fuel cell system. More particularly, it relates to cell voltage recovery processing of a fuel cell stack.

BACKGROUND ART

In recent years, as part of efforts against environmental problems, low-pollution cars have been developed, and the cars include a fuel cell vehicle in which a fuel cell stack is used as a car-mounted power source. The fuel cell stack has a stack structure in which a plurality of cells are stacked in series, and each cell has a membrane-electrode assembly in which an anode pole is arranged on one face of an electrolytic film, whereas a cathode pole is arranged on the other face thereof. A fuel gas and an oxidizing gas are supplied to the membrane-electrode assembly to cause an electrochemical reaction, and chemical energy is converted into electric energy. Above all, a solid polymer electrolyte type fuel cell stack in which a solid polymer film is used as an electrolyte can easily be made compact at a low cost, and additionally it has a high output density. In consequence, the use application of the fuel cell stack as the car-mounted power source is expected.

When a fuel cell system is operated, it is necessary to detect a power generation error caused by a deficiency in the supply of the reactant gas due to flooding, the drying of the membrane-electrode assembly or the like, thereby recovering the state of each cell so as to take out a sufficient output. In Japanese Patent Application Laid-Open No. 2004-165058, there is suggested a technology for monitoring the lowering of a cell voltage, and executing cell voltage recovery processing while limiting the output, in a case where the cell voltage is below a predetermined lower limit voltage threshold.

[Patent Document 1] Japanese Patent Application Laid-Open No. 2004-165058

DISCLOSURE OF THE INVENTION

However, in a fuel cell stack in which a plurality of cells are stacked, factors for the lowering of a voltage vary, depending on places where the cells are arranged. Therefore, when the same cell voltage recovery processing is executed for all the cells, the cell voltage recovery processing is executed more than necessary, or an output is sometimes excessively limited to lower an operation efficiency.

Consequently, in view of such a problem, an object of the present invention is to appropriately execute cell voltage recovery processing in accordance with the places where the cells are arranged.

To achieve the above object, a fuel cell system according to the present invention comprises: a fuel cell stack in which a plurality of cells are stacked; and a cell voltage control device which executes first cell voltage recovery processing when the cell voltage of a first cell group, placed at each end of the fuel cell stack, is below a first lower limit voltage threshold and which executes second cell voltage recovery processing, which is different from the first cell voltage recovery processing, when the cell voltage of a second cell group, placed at substantially the center of the fuel cell stack, is below a second lower limit voltage threshold.

In the first cell group placed at each end of the cell stack (an anode pole side end and a cathode pole side end), as compared with the second cell group placed at substantially the center of the cell stack, a temperature difference is easily made in the cell, between the cells or between the poles, and the lowering of the cell voltage due to a deficiency in the supply of a reactant gas, caused by flooding or the like, easily occurs. In particular, at a low-temperature start, there is a high necessity of avoiding a cell damage due to the deficiency in the supply of a fuel gas, and hence the cell voltage management of the first cell group needs to be stringently performed.

On the other hand, such flooding rarely occurs in the second cell group, and the factor for the lowering of the cell voltage is mainly the increase of a resistance due to the drying of an electrolytic film. The damage given to the cells by the drying of the electrolytic film is smaller than that given to the cells by the deficiency in the fuel gas supply, and hence the cell voltage management of the second cell group can be performed more moderately than that of the first cell group.

The factors for the lowering of the cell voltage vary in accordance with the places where the cells are arranged for the above reasons, and hence it is appropriate to perform cell voltage recovery processing when the cell arrangement place where the lowering of the cell voltage is caused is the end of the cell stack, which is different from the cell voltage recovery processing performed when the place is substantially the center of the cell stack.

The cell voltage control device executes, as the first cell voltage recovery processing, processing to eliminate the deficiency in the supply of the fuel gas to the first cell group. As described above, the first cell group has a tendency that the deficiency in the reactant gas supply due to the flooding easily occurs. Above all, it has been found that the deficiency in the supply of the fuel gas to the cells gives more serious damage to the cells than the deficiency in the supply of an oxidizing gas. Therefore, when the lowering of the cell voltage is detected, first, processing to eliminate the deficiency in the fuel gas supply (e.g., the raising of the supply pressure of the fuel gas, the increasing of the amount of the fuel gas to be supplied or the like) is preferably executed to try cell voltage recovery.

Even when the cell voltage control device executes the processing to eliminate the deficiency in the supply of the fuel gas to the first cell group as the first cell voltage recovery processing, the cell voltage of the first cell group does not recover to the first lower limit voltage threshold or more. In this case, the device executes the processing to eliminate the deficiency in the supply of an oxidizing gas to the first cell group. The deficiency in the oxidizing gas supply is considered as one of causes, in a case where even when the processing to eliminate the deficiency in the fuel gas supply is executed, the cell voltage of the first cell group does not recover. Therefore, in such a case, the processing to eliminate the deficiency in the oxidizing gas supply (e.g., the increasing of the amount of the oxidizing gas to be supplied or the like) is preferably executed to try the cell voltage recovery.

The cell voltage control device executes, as the second cell voltage recovery processing, processing to increase the amount of the electrolytic film of the second cell group to be wetted when the amount of the electrolytic film of the second cell group to be wetted is less than a predetermined amount. As described above, as the factor for the lowering of the cell voltage in the second cell group, the lowering of proton conductivity due to the drying of the electrolytic film is considered rather than the deficiency in the gas supply due to the flooding. In consequence, when the amount of the electrolytic film of the second cell group to be wetted is less than a predetermined value (i.e., when the alternate-current impedance of the fuel cell stack is a predetermined value or more), the processing to increase the amount of the electrolytic film of the second cell group to be wetted (e.g., the supply pressure of the oxidizing gas is raised to decrease the amount of a water content carried away by the oxidizing gas) is preferably executed to try the cell voltage recovery.

The cell voltage control device executes, as the second cell voltage recovery processing, processing to eliminate the deficiency in the supply of the fuel gas to the second cell group when the amount of the electrolytic film of the second cell group to be wetted is the predetermined value or more. When the amount of the electrolytic film of the second cell group to be wetted is the predetermined value or more, as the factor for the lowering of the cell voltage in the second cell group, the deficiency in the reactant gas supply due to the flooding caused by a temporary or accidental phenomenon is considered. Therefore, as the second cell voltage recovery processing, the processing to eliminate the deficiency in the supply of the fuel gas to the second cell group is preferably executed to try the cell voltage recovery, when the amount of the electrolytic film of the second cell group to be wetted is the predetermined value or more (i.e., the alternate-current impedance of the fuel cell stack is less than a predetermined value).

BRIEF DESCRIPTION OF THE DRAWINGS

FIG. 5 is a flow chart showing cell voltage recovery processing according to the present embodiment.

BEST MODE FOR CARRYING OUT THE INVENTION

Hereinafter, an embodiment of the present invention will be described with reference to the drawings.

Figure 1:
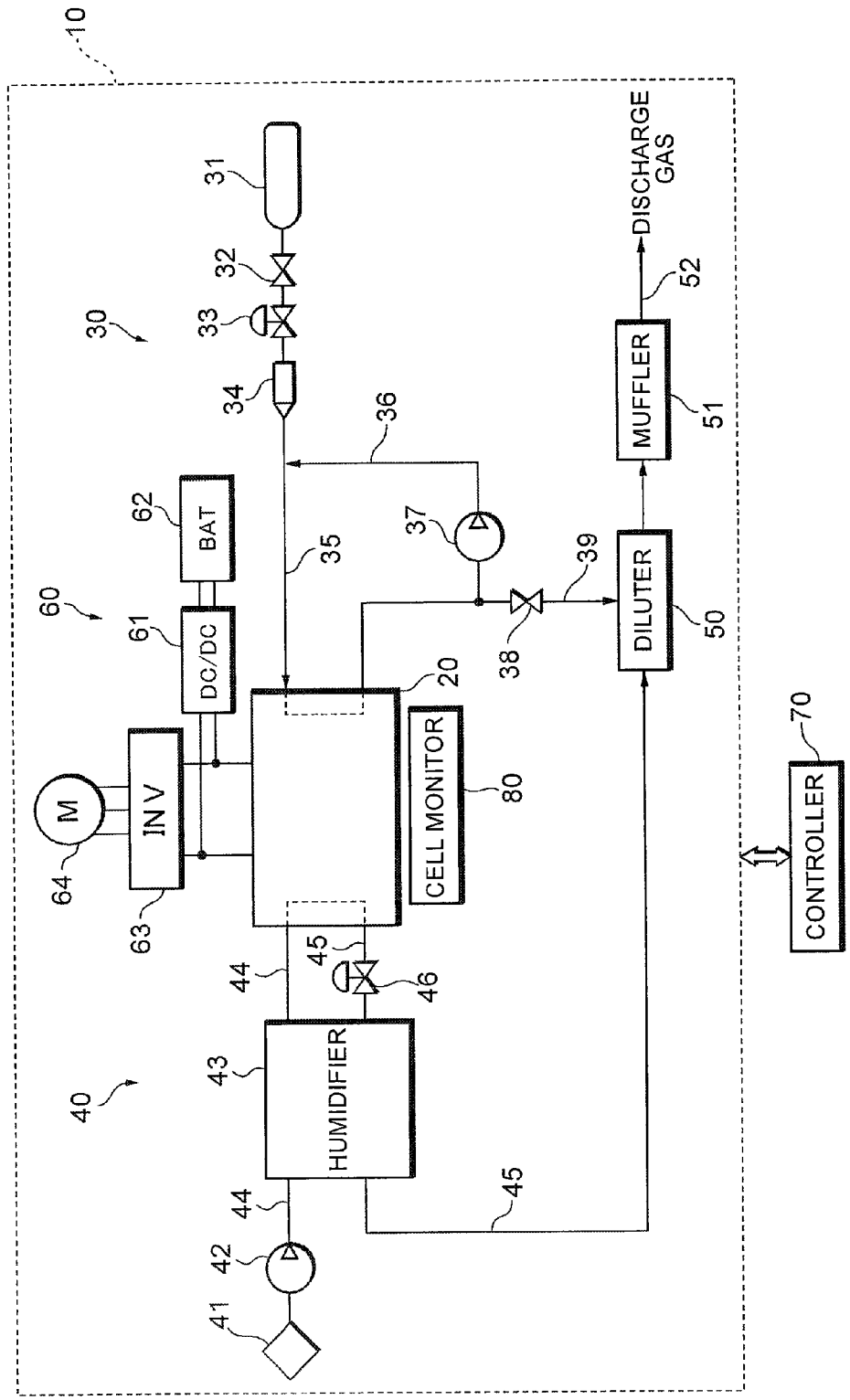
FIG. 1 a system constitution diagram of a fuel cell system according to the present embodiment.

FIG. 1 shows a system constitution of a fuel cell system 10 which functions as a car-mounted power source system of a fuel cell vehicle.

The fuel cell system 10 includes a fuel cell stack 20 which receives a supplied reactant gas (an oxidizing gas and a fuel gas) to generate a power; a fuel gas piping system 30 which supplies a hydrogen gas as the fuel gas to the fuel cell stack 20; an oxidizing gas piping system 40 which supplies air as the oxidizing gas to the fuel cell stack 20; a power system 60 which controls the charging/discharging of the power; and a controller 70 which generally controls the whole system.

The fuel cell stack 20 is a solid polymer electrolyte type cell stack in which a large number of cells are stacked in series. Each cell has a cathode pole on one face of an electrolytic film constituted of an ion exchange membrane and an anode pole on the other face of the film, and further has a pair of separators to sandwich the cathode pole and the anode pole from both sides. The fuel gas is supplied to a fuel gas passage of one of the separators, the oxidizing gas is supplied to an oxidizing gas passage of the other separator, and the fuel cell stack 20 receives this supplied gas to generate the power.

In the fuel cell stack 20, an oxidizing reaction of formula (1) occurs in the anode pole, and a reducing reaction of formula (2) occurs in the cathode pole. In the whole fuel cell stack 20, an electromotive reaction of formula (3) occurs.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

A cell monitor 80 is a cell voltage detection device for detecting the voltages of the plurality of cells constituting the fuel cell stack 20.

The fuel gas piping system 30 has a fuel gas supply source 31; a fuel gas supply passage 35 through which the fuel gas (the hydrogen gas) to be supplied from the fuel gas supply source 31 to the anode pole of the fuel cell stack 20 flows; a circulation passage 36 for returning, to the fuel gas supply passage 35, a fuel off gas (a hydrogen off gas) discharged from the fuel cell stack 20; a circulation pump 37 which feeds, to the fuel gas supply passage 35, the fuel off gas under pressure in the circulation passage 36; and an exhaust passage 39 branched from and connected to the circulation passage 36.

The fuel gas supply source 31 is constituted of, for example, a high-pressure hydrogen tank, a hydrogen occluded alloy or the like, and receives the hydrogen gas with a pressure of, for example, 35 MPa or 70 MPa. When a block valve 32 is opened, the fuel gas is discharged from the fuel gas supply source 31 to the fuel gas supply passage 35. The pressure of the hydrogen gas is decreased to, for example, about 200 kPa by a regulator 33 or an injector 34, to supply the gas to the fuel cell stack 20.

It is to be noted that the fuel gas supply source 31 may be constituted of a reformer which forms a hydrogen-rich reformed gas from a hydrocarbon-based fuel, and a high-pressure gas tank which brings the reformed gas formed by this reformer into a high-pressure state to accumulate the pressure.

The injector 34 is an electromagnetic driving type opening/closing valve in which a valve body is directly driven with an electromagnetic driving force for a predetermined driving period and detached from a valve seat, whereby a gas flow rate or a gas pressure can be regulated. The injector 34 includes the valve seat having jet holes which jet a gas fuel such as the fuel gas, and also includes a nozzle body which supplies and guides the gas fuel to the jet holes, and the valve body movably received and held in an axial direction (a gas flow direction) with respect to this nozzle body to open or close the jet holes.

The circulation passage 36 is connected to the exhaust passage 39 via an exhaust valve 38. The exhaust valve 38 operates in accordance with a command from the controller 70, to discharge, to the outside, the fuel off gas including impurities in the circulation passage 36 together with a water content. When the exhaust valve 38 opens, the concentration of the impurities in the hydrogen off gas of the circulation passage 36 lowers, and the concentration of hydrogen in the fuel off gas to be circulated and supplied rises.

The fuel off gas discharged through the exhaust valve 38 and the exhaust passage 39 and an oxidizing off gas flowing through an exhaust passage 45 flow into a diluter 50 which dilutes the fuel off gas. The discharge sound of the diluted fuel off gas is eliminated by a muffler (a silencer) 51, and the gas flows through a tail pipe 52, and is discharged from the car.

The oxidizing gas piping system 40 has an oxidizing gas supply passage 44 through which the oxidizing gas to be supplied to the cathode pole of the fuel cell stack 20 flows, and the exhaust passage 45 through which the oxidizing off gas discharged from the fuel cell stack 20 flows. The oxidizing gas supply passage 44 is provided with a compressor 42 which takes the oxidizing gas through a filter 41, and a humidifier 43 which humidifies the oxidizing gas to be fed under pressure by the compressor 42. The exhaust passage 45 is provided with a back pressure regulation valve 46 for regulating an oxidizing gas supply pressure, and the humidifier 43.

The humidifier 43 receives a hollow string film bunch constituted of a large number of hollow string films. The highly wet oxidizing off gas (the wet gas) containing a large amount of the water content generated by a cell reaction flows through the hollow string films, whereas a lowly wet oxidizing gas (the dry gas) taken from the atmosphere flows outside the hollow string films. Water content exchange can be performed between the oxidizing gas and the oxidizing off gas through the hollow string films, to humidify the oxidizing gas.

The power system 60 includes a DC/DC converter 61, a battery 62, a traction inverter 63 and a traction motor 64. The DC/DC converter 61 is a direct-current voltage converter and has a function of raising a direct-current voltage from the battery 62 to output the voltage to the traction inverter 63 and a function of lowering a direct-current voltage from the fuel cell stack 20 or the traction motor 64 to charge the battery 62. The charging/discharging of the battery 62 is controlled by these functions of the DC/DC converter 61. Moreover, an operation point (the output voltage, an output current) of the fuel cell stack 20 is controlled by voltage conversion control of the DC/DC converter 61.

The battery 62 is a capacitor capable of charging and discharging the power, and functions as a regenerative energy storage source during regenerative braking or an energy buffer during load fluctuation accompanying acceleration or deceleration of the fuel cell vehicle. As the battery 62, for example, a nickel/cadmium accumulator battery, a nickel/hydrogen accumulator battery, or a secondary battery such as a lithium secondary battery is preferable.

The traction inverter 63 converts a direct current into a three-phase alternate current to provide the thus converted current to the traction motor 64. The traction motor 64 is, for example, a three-phase alternate current motor, which constitutes a power source for a fuel cell vehicle.

The controller 70 is a computer system including a CPU, ROM, RAM and input/output interfaces, and controls the respective parts of the fuel cell system 10. For example, when receiving a start signal output from an ignition switch (not shown), the controller 70 starts the operation of the fuel cell system 10 to determine the required power for the whole system on the basis of an accelerator open degree signal output from an accelerator sensor (not shown), a vehicle speed signal output from a vehicle speed sensor (not shown) and the like. The required power for the whole system is a total value of a vehicle running power and an auxiliary machinery power. Examples of the auxiliary machinery power include a power consumed by in-vehicle auxiliaries (a humidifier, air compressor, hydrogen pump, cooling water circulating pump and the like), a power consumed by devices necessary for vehicle running (a transmission, wheel controller, steering device, suspension device and the like), and a power consumed by devices disposed within a passenger space (an air conditioner, lighting fixture, audio units and the like).

The controller 70 determines the distribution of the output power from the fuel cell stack 20 and the battery 62, adjusts the rotation number of the compressor 42 and the open degree of a valve for the injector 34 so that an electricity production of the fuel cell stack 20 reaches a target power, adjusts the amount of a reactant gas to be supplied to the fuel cell stack 20, and controls the DC/DC converter 61 to adjust an output voltage of the fuel cell stack 20, whereby operating points (output voltage and output current) of the fuel cell stack 20 are controlled. Furthermore, in order to achieve the target vehicle speed in accordance with the accelerator open degree, the controller 70 outputs alternate current voltage command values of a U phase, V phase and W phase to the traction inverter 63 as switching commands, thereby controlling the output torque and the rotation number of the traction motor 64.

The controller 70 monitors the presence of power generation error of the fuel cell stack 20 based on the cell voltage of each cell detected by the cell monitor 80, and executes cell voltage recovery processing or limits the output on judging that the power generation error occurs. Details of the cell voltage recovery processing will be described later.

Figure 2:
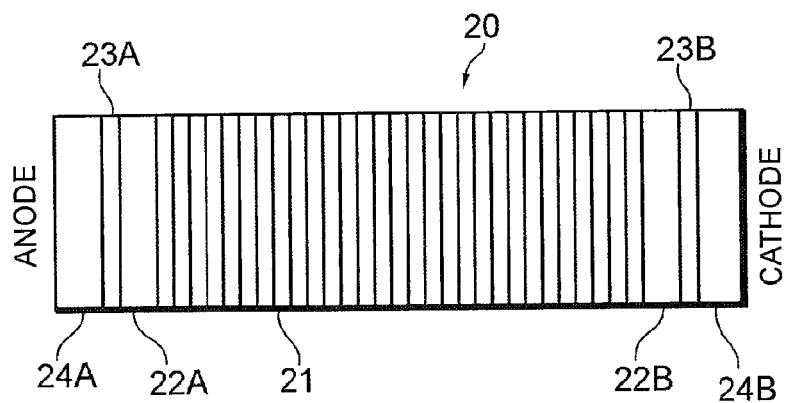
FIG. 2 is a schematic diagram showing a structure of a fuel cell stack.

FIG. 2 is a schematic diagram showing a structure of the fuel cell stack 20.

As shown in the drawing, a pair of terminal plates 22A, 22B for taking out the power are arranged at both ends of the cell stack in which N (N is an integer of 2 or more) cells 21 are stacked. The terminal plate 22A is the anode pole, and the terminal plate 22B is the cathode pole. The outer sides of the terminal plates 22A, 22B are fixedly sandwiched between a pair of end plates 24A and 24B via insulating plates 23A, 23B. Cell numbers are assigned to the respective cells 21, and the cell number increases from the terminal plate 22A to the terminal plate 22B. For example, the cell number of the cell 21 closest to the terminal plate 22A is 1, and the cell number of the cell 21 closest to the terminal plate 22B is N.

Figure 3:
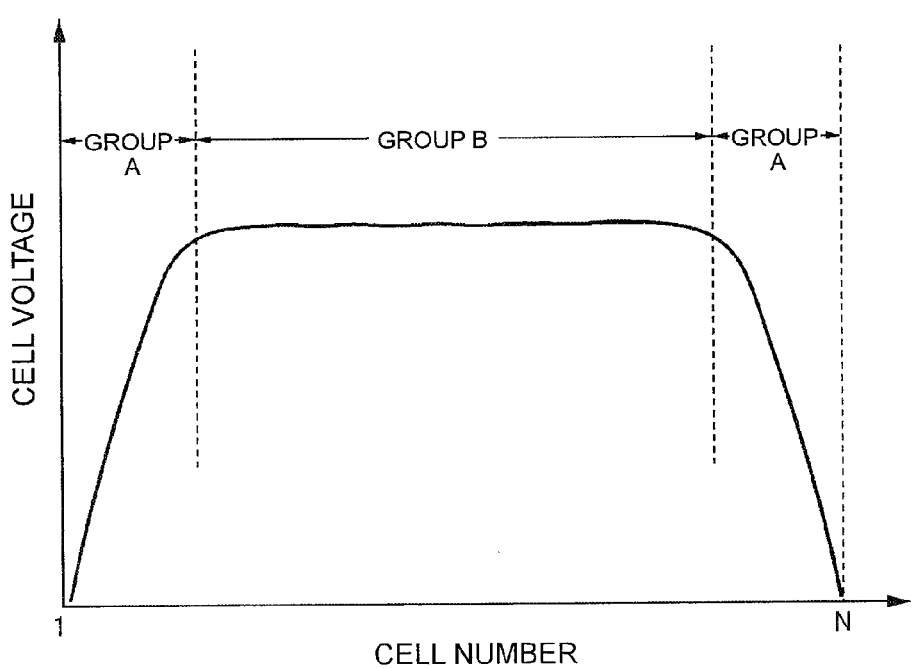
FIG. 3 is a graph showing the cell voltage distribution of the fuel cell stack.

FIG. 3 is a graph showing the cell voltage distribution of the fuel cell stack 20.

In the drawing, the abscissa indicates the cell number, and the ordinate indicates the cell voltage. In the fuel cell stack 20, in a case where heat is taken from the end plates 24A, 24B which come in contact with outside air, in a cell group (hereinafter referred to as the group A for the sake of description) arranged at the end of the cell stack (an anode pole side end, and a cathode pole side end), a temperature difference is easily made in the cell, between the cells or between the poles, as compared with a cell group (hereinafter referred to as the group B for the sake of description) arranged in substantially the center of the cell stack. In consequence, in the group A is seen a tendency that the cell voltage lowers at a portion closer to the cell stack end. This is because the water content is condensed at a portion having a low temperature in each cell, and flooding is generated from the condensed portion as a starting point, to easily cause the lowering of the cell voltage. In particular, in the fuel cell stack 20 left to stand for a long time after the stop of a cell operation, the water content moves from the cathode pole to the anode pole through the electrolytic film, and hence at a low-temperature start, a deficiency in the fuel gas supply due to the flooding sometimes occurs. It has been found that the cells 21 are damaged by the power generation with the deficiency in the fuel gas supply, and hence in the group A, strict cell voltage management is necessary.

On the other hand, in the group B, the above flooding rarely occurs, and a factor for the lowering of the cell voltage is mainly the increase of a resistance (the lowering of proton conductivity) due to the drying of the electrolytic film. In the group B, an only small temperature difference is made in each cell, between the cells or between the poles, and hence any cell has an approximately equal cell voltage. The damage given to the cells 21 by the drying of the electrolytic film is smaller than that given to the cells 21 by the deficiency in the fuel gas supply, and hence the cell voltage management of the group B can be performed more moderately than that of the group A. Specifically, a lower limit voltage threshold Vth2 of the group B can be set to a voltage lower than a lower limit voltage threshold Vth1 of the group A. Moreover, a lower limit voltage allowing time threshold T2 of the group B can be set to a time longer than a lower limit voltage allowing time threshold T1 of the group A. Here, from a viewpoint of the damage that the cells 21 undergo owing to the power generation error, the lower limit voltage threshold is the minimum voltage at which the lowering of the cell voltage can be allowed, and from the viewpoint of the damage that the cells 21 undergo owing to the power generation error, the lower limit voltage allowing time threshold is the longest time for which a state where the cell voltage is below the lower limit voltage threshold can be allowed.

Figure 4:
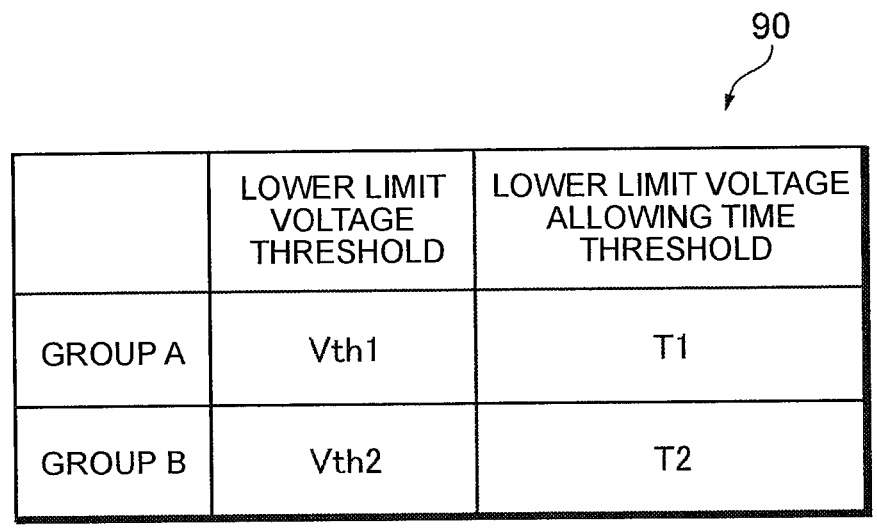
FIG. 4 is an explanatory view of a cell voltage management table.

FIG. 4 shows a cell voltage management table 90.

The cell voltage management table 90 stores the lower limit voltage thresholds and the lower limit voltage allowing time thresholds of the groups A and B, respectively. The controller 70 holds the cell voltage management table 90, and functions as a cell voltage control device which manages the cell voltage based on the cell voltage output from the cell monitor 80. Specifically, the controller 70 checks whether or not the cell voltage of each of the groups A and B is below the lower limit voltage threshold. In a case where the cell voltage is below the lower limit voltage threshold, the controller checks whether or not a time when the cell voltage is below the lower limit voltage threshold exceeds the lower limit voltage allowing time threshold. Moreover, in a case where the time when the cell voltage is below the lower limit voltage threshold exceeds the lower limit voltage allowing time threshold, the controller executes the cell voltage recovery processing or executes output current limit processing.

Thus, the lower limit voltage threshold Vth2 of the group B is set to a voltage lower than the lower limit voltage threshold Vth1 of the group A to perform the cell voltage management, whereby it is possible to avoid the lowering of the operation efficiency at a time when the group B is subjected to the cell voltage recovery processing more than necessary or the output is excessively limited.

Moreover, the lower limit voltage allowing time threshold T2 of the group B is set to a time longer than the lower limit voltage allowing time threshold T1 of the group A to perform the cell voltage management, whereby it is possible to avoid the lowering of the operation efficiency at a time when the group B is subjected to the cell voltage recovery processing more than necessary or the output is excessively limited.

FIG. 5 is a flow chart showing the cell voltage recovery processing according to the present embodiment.

On detecting the cell in which the cell voltage is below the lower limit voltage threshold (a step 501), the controller 70 judges whether the cell belongs to the group A or B (a step 502).

In a case where the cell in which the cell voltage is below the lower limit voltage threshold belongs to the group A, the controller 70 performs processing to increase the amount of the fuel gas to be supplied to the fuel cell stack 20 (a step 503). As described above, in the group A which comes close to the end plate 24A or 24B, the temperature difference is easily made in each cell, between the cells or between the poles, and the lowering of the cell voltage due to the deficiency in the reactant gas supply caused by the flooding or the like easily occurs. In particular, at the low-temperature start, there is a high necessity of avoiding the damage of the cells 21 by the deficiency in the fuel gas supply, and hence as the processing to eliminate the deficiency in the supply of the fuel gas to the group A, it is preferable to perform processing for controlling the injector 34 to raise the supply pressure of the fuel gas supplied to the fuel cell stack 20 or for controlling the rotation number of the circulation pump 37 to increase the flow rate of the fuel gas flowing into the fuel cell stack 20, thereby trying the cell voltage recovery.

Moreover, the controller 70 judges whether or not the cell voltage recovers to the lower limit voltage threshold or more (a step 504). When the cell voltage recovers to the lower limit voltage threshold or more (the step 504; YES), the controller 70 continues the power generation as it is (a step 508).

When the cell voltage does not recover to the lower limit voltage threshold (the step 504; NO), the controller 70 performs processing for increasing the amount of the oxidizing gas to be supplied to the fuel cell stack 20 (a step 505). When the processing for eliminating the deficiency in the supply of the fuel gas to the group A is executed but the cell voltage does not recover to the lower limit voltage threshold or more, the deficiency in the oxidizing gas supply can be considered as one of causes. As the processing for eliminating the deficiency in the supply of the oxidizing gas to the group A, for example, processing for controlling the rotation number of the compressor 42 to increase the supply amount of the oxidizing gas which flows into the fuel cell stack 20 or the like is preferably executed to try the cell voltage recovery.

Then, the controller 70 judges whether or not the cell voltage recovers to the lower limit voltage threshold or more (a step 506). When the cell voltage recovers to the lower limit voltage threshold or more (the step 506; YES), the controller 70 continues the power generation as it is (the step 508).

When the cell voltage does not recover to the lower limit voltage threshold or more (the step 506; NO), the controller 70 limits the output current to be taken from the fuel cell stack 20 so that the cell voltage is the lower limit voltage threshold or more (a step 507), thereby returning to the processing of the step 503.

It is to be noted that when the output of the fuel cell stack 20 is limited, the output of the fuel cell stack 20 sometimes does not satisfy a demanded system power. In such a case, a deficient power is compensated by the battery 62.

On the other hand, in a case where the cell in which the cell voltage is below the lower limit voltage threshold belongs to the group B, the controller 70 checks whether or not an alternate-current impedance Z of the fuel cell stack 20 exceeds a predetermined value Z0 (a step 509). The deficiency in the reactant gas supply due to the flooding cannot easily be considered as the factor for the lowering of the cell voltage in the group B, and the increase of the resistance due to the drying of the electrolytic film is mainly considered as the factor. The alternate-current impedance Z has a correlation with respect to the wet state of the electrolytic film, and hence the alternate-current impedance Z can be measured to detect the wet state of the electrolytic film.

The DC/DC converter 61 may function as an alternate-current signal applying device which applies an alternate-current signal to the fuel cell stack 20 for a purpose of measuring the alternate-current impedance of the fuel cell stack 20. The cell monitor 80 measures the response voltage of each cell at a time when the alternate-current signal is applied to the fuel cell stack 20. The controller 70 controls the DC/DC converter 61 to detect the changes of the response voltage of each cell while changing the frequency of the alternate-current signal applied to the fuel cell stack 20, thereby calculating the alternate-current impedance Z of the fuel cell stack 20.

It is to be noted that it is known that the response voltage of the fuel cell stack 20 at the time when the alternate-current signal is applied to the fuel cell stack 20 is E, the response current is I and the alternate-current impedance is Z, the following relational equations are established:

$$E = E_0 \exp j(\omega t + \Phi);$$

$$I = I_0 \exp j \omega t; \text{ and}$$

$$Z = E/I = (E_0/I_0) \exp j\Phi = R + j\chi,$$

in which $E_0$ is the amplitude of the response voltage, $I_0$ is the amplitude of the response current, $\omega$ is an angular frequency, $\Phi$ is an initial phase, R is a resistance component (a real part), $\chi$ is a reactance component (an imaginary part), j is an imaginary unit, and t is the time.

When the alternate-current impedance Z exceeds the predetermined value Z0 (the step 509; YES), the cells of the group B is on a dry side. Therefore, the controller 70 controls, for example, the back pressure regulation valve 46 to raise the supply pressure of the oxidizing gas to be supplied to the fuel cell stack 20 (a step 510); and the controller decreases the amount of the water content carried away by the oxidizing gas to easily accumulate the water content in the fuel cell stack 20.

Moreover, the controller 70 judges whether or not the cell voltage recovers to the lower limit voltage threshold or more (a step 511). When the cell voltage recovers to the lower limit voltage threshold or more (the step 511; YES), the controller 70 continues the power generation as it is (a step 513).

When the cell voltage does not recover to the lower limit voltage threshold or more (the step 511; NO), the controller 70 limits the output current to be taken from the fuel cell stack 20 so that the cell voltage is the lower limit voltage threshold or more (a step 512), thereby advancing to the processing of the step 503.

When the alternate-current impedance Z does not exceed the predetermined value Z0 (the step 509; NO), the cells of the group B are appropriately wetted. Therefore, as the factor for the lowering of the cell voltage, the lowering of proton conductivity due to the drying of the electrolytic film is not easily considered, but the deficiency in the reactant gas supply due to the flooding caused by a temporary or accidental phenomenon is considered. Therefore, the controller 70 advances to the step 503 to execute the processing for eliminating the deficiency in the reactant gas supply, thereby trying the cell voltage recovery.

According to the present embodiment, the appropriate cell voltage recovery processing can be executed in accordance with the cell arrangement place where the lowering of the cell voltage is caused, and additionally the output limit (current limit) of the fuel cell stack 20 can be minimized, so that the improvement of an operation efficiency can be expected. Moreover, the cell voltage distribution shown in FIG. 3 can be seen not only at the low-temperature start but also during the cell operation. Therefore, the cell voltage management according to the present embodiment is effective not only at the low-temperature start but also during the cell operation.

The examples or the application examples described through the embodiment of the present invention can appropriately be combined, altered or modified in accordance with application, when used, and the present invention is not limited to the above description of the embodiment. It would be apparent from claims that even such combined, altered or modified configuration can be included in the technical scope of the present invention.

For example, in the above embodiment, both the cell group arranged at the anode pole side end of the fuel cell stack 20 and the cell group arranged at the cathode pole side end are referred to as the group A, and the cell group arranged at substantially the center of the fuel cell stack 20 is referred to as the group B. However, for example, the cell group arranged at the anode pole side end of the fuel cell stack 20 is referred to the group A, the cell group arranged at substantially the center of the fuel cell stack 20 is referred to as the group B, the cell group arranged at the cathode pole side end is referred to as a group C, and different types of cell voltage recovery processing may be executed for the groups A, B and C, respectively. In particular, during the cell operation, the water content tends to be easily accumulated at the cathode pole side end. Therefore, when the fuel cell stack 20 is divided into the groups A, B and C, respectively, finer cell voltage management can be realized.

In this case, there is considered a method of first executing the processing for eliminating the deficiency in the oxidizing gas supply as the cell voltage recovery processing at a time when the cells belonging to the group C cause the lowering of the cell voltage; executing the processing for eliminating the deficiency in the fuel gas supply, when the cell voltage still does not recover; and limiting the output current to be taken from the fuel cell stack 20, when the cell voltage still does not recover.

As another example of the cell voltage recovery processing at the time when the cells belonging to the group C cause the lowering of the cell voltage, there is considered a method of first executing the processing for eliminating the deficiency in the fuel gas supply; executing the processing for eliminating the deficiency in the oxidizing gas supply, when the cell voltage still does not recover; and limiting the output current to be taken from the fuel cell stack 20, when the cell voltage still does not recover.

It is to be noted that the cell voltage recovery processing at a time when the cells belonging to the groups A and B cause the lowering of the cell voltage in a case where the fuel cell stack 20 is divided into the groups A, B and C is similar to the cell voltage recovery processing at a time when the cells belonging to the groups A and B cause the lowering of the cell voltage in a case where the fuel cell stack 20 is divided into the groups A and B.

Moreover, in the above embodiment, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source of a mobile body (a robot, a ship, an airplane or the like) other than the fuel cell vehicle. Furthermore, the fuel cell system 10 according to the present embodiment may be used as a power generation facility (a stational power generation system) of a housing, a building or the like.

Industrial Applicability

According to the present invention, appropriate cell voltage recovery processing can be executed in accordance with a cell arrangement place where the lowering of a cell voltage is caused, and hence the operation efficiency of a fuel cell stack can be improved.

The invention claimed is:

1. A fuel cell system comprising:
    a fuel cell stack in which a plurality of cells are stacked; and
    a cell voltage control device programmed to execute first cell voltage recovery processing in response to flooding of a first cell group, placed at each end of the fuel cell stack, wherein the control device is programmed to determine that the flooding occurs when the cell voltage of the first cell group is below a first lower limit voltage threshold and the cell voltage control device is programmed to execute second cell voltage recovery processing in response to drying of a second cell group, placed at substantially the center of the fuel cell stack, wherein the control device is programmed to determine that the drying occurs when the cell voltage of the second cell group is below a second lower limit voltage threshold, wherein the cell voltage control device is programmed to set the second lower limit voltage threshold lower than the first lower limit voltage threshold.

2. The fuel cell system according to claim 1, wherein the cell voltage control device executes, as the first cell voltage recovery processing, processing to eliminate the deficiency in the supply of the fuel gas to the first cell group.

3. The fuel cell system according to claim 2, wherein even when the cell voltage control device executes the processing to eliminate the deficiency in the supply of the fuel gas to the first cell group as the first cell voltage recovery processing but when the cell voltage of the first cell group does not recover to the first lower limit voltage threshold or more, the cell voltage control device executes processing to eliminating the deficiency in the supply of an oxidizing gas to the first cell group.

4. The fuel cell system according to claim 1, wherein the cell voltage control device executes, as the second cell voltage recovery processing, processing to increase the amount of an electrolytic film of the second cell group to be wetted when the amount of the electrolytic film of the second cell group to be wetted is less than a predetermined amount.

5. The fuel cell system according to claim 1, wherein the cell voltage control device executes, as the second cell voltage recovery processing, processing to eliminate the deficiency in the supply of the fuel gas to the second cell group when the amount of an electrolytic film of the second cell group to be wetted is a predetermined value or more.

* * * * *